United States Patent
Van Lier

(10) Patent No.: US 11,226,603 B2
(45) Date of Patent: Jan. 18, 2022

(54) AUTOMATION SYSTEM FOR PROCESS AUTOMATION AND A CORRESPONDING METHOD

(71) Applicant: WAGO VERWALTUNGSGESELLSCHAFT MBH, Minden (DE)

(72) Inventor: Stefan Van Lier, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 357 days.

(21) Appl. No.: 16/253,964

(22) Filed: Jan. 22, 2019

(65) Prior Publication Data

US 2019/0227508 A1    Jul. 25, 2019

(30) Foreign Application Priority Data

Jan. 19, 2018   (DE) .................... 10 2018 101 201.2

(51) Int. Cl.
*G05B 19/042*   (2006.01)
*G06F 9/06*   (2006.01)

(52) U.S. Cl.
CPC ............. *G05B 19/042* (2013.01); *G06F 9/06* (2013.01); *G05B 2219/25006* (2013.01); *G05B 2219/25112* (2013.01)

(58) Field of Classification Search
CPC ........ G05B 19/042; G05B 2219/25112; G05B 2219/25006; G06F 9/06
USPC .......................................................... 700/86
See application file for complete search history.

(56) References Cited

U.S. PATENT DOCUMENTS

2017/0102678 A1*   4/2017   Nixon ................ G05B 19/4185

FOREIGN PATENT DOCUMENTS

DE    102016119186 A1    4/2017
DE    202016000250 U1    4/2017
WO    WO2011137464 A1    11/2011

OTHER PUBLICATIONS

Thane et al. "Replay Debugging of Real-Time Systems Using Time Machines", Mälardalen University, Västarås, Sweden.
Thane et al. "Replay Debugging of Real-Time Systems Using Time Machines", Proc. of Int'l Parallel & Distributed Processing Symposium, pp. 1-8 (2003).

* cited by examiner

*Primary Examiner* — Michael J Brown
(74) *Attorney, Agent, or Firm* — Muncy, Geissler, Olds & Lowe, P.C.

(57) ABSTRACT

An automation system for process automation including at least one automation device which has at least one fieldbus interface for connection to a bus for transmitting process data, an arithmetic unit, a digital data memory and a data interface for transmitting program-flow-related event data; and an analysis device connected to the at least one automation device. The automation device is set up to run one or more computer programs with the aid of the arithmetic unit and to capture program flow events occurring during the running of the at least one computer program and to store them together with current time information as program-flow-related event data in the digital data memory, and wherein the arithmetic unit of the automation device is set up to continuously send the program-flow-related event data stored in the digital data memory to the analysis device connected via the data interface.

18 Claims, 3 Drawing Sheets

AUTOMATION SYSTEM FOR PROCESS AUTOMATION AND A CORRESPONDING METHOD

This nonprovisional application claims priority under 35 U.S.C. § 119(a) to German Patent Application No. 10 2018 101 201.2, which was filed in Germany on Jan. 19, 2018, and which is herein incorporated by reference.

BACKGROUND OF THE INVENTION

Field of the Invention

The present invention relates to an automation system for process automation, wherein the automation system has at least one automation device and one analysis device. The invention also relates to a method for monitoring at least one automation device by means of such an analysis device.

Description of the Background Art

In automation systems, one or more processes are partially or completely automated by means of automation devices. For this purpose, the automation devices are connected via fieldbus interfaces to a fieldbus or bus, via which the automation devices can receive process data from sensors that are also connected to the fieldbus or can send process data to actuators that are also connected to the fieldbus.

It is not uncommon for several automation devices to regulate and control a process with the help of several actuators in such a way that the activation of the individual actuators by the automation devices takes place completely synchronously. The temporal synchronization of the activation is an essential quality and security feature of such automation systems, which may also need to be verifiable. Also in the error analysis of a run-time error of the process automation by using the automation system, it is necessary to be able to check the temporal synchronicity of the entire system.

From DE 20 2016 000 250 U1, which is incorporated herein by reference, a system for monitoring at least one electric drive is known, wherein the drive is controlled by means of a controller. The resulting process data are transmitted via a separate interface to a multichannel oscilloscope so that the process data can be displayed there. This allows for the course of sensor data, which are determined in the control of the drive, to be graphically displayed on a display in the form of oscilloscope data.

However, in the conventional art it is not possible to capture the temporal synchronization of the control per se and display it accordingly so that the temporal synchronicity can be checked.

SUMMARY OF THE INVENTION

It is therefore an object of the present invention to provide an improved automation system and an improved method for its implementation, with which the temporal synchronicity of one or more automation devices can be checked and determined.

According to an exemplary embodiment, an automation system for process automation is provided, wherein the automation system has at least one automation device and one analysis device. The automation device generically has a fieldbus interface for connection to a bus or fieldbus for the transmission of process data, whereby the automation device can be connected to field devices, such as sensors or actuators, that are connected to the fieldbus. Furthermore, the automation device has an arithmetic unit and a digital data memory so as to run one or more computer programs using the arithmetic unit. In addition, the automation device has a data interface which is provided for the transmission of program-flow-related event data. Such a data interface may for example be a conventional Ethernet interface for connecting the automation device to an Ethernet network.

The analysis device, which may be, for example, a standard PC or laptop, also has a data interface and is also connected via the data network to the data interface with the at least one automation device. In this case, the analysis device is designed such that it receives the program-flow-related event data sent by the automation devices via the data interface and shows it on a display.

In order to put the automation device into operation, the automation device is further configured to run one or more computer programs by means of the arithmetic unit, wherein such computer programs may be, for example, firmware. Within the firmware, further program modules can be run by the firmware, whereby the firmware itself is a kind of operating system for the automation device, while the individual program modules can be the corresponding application programs that are installed and run specifically for purposes of process automation.

The at least one automation device is further configured to capture program flow events occurring during the running of the at least one computer program (firmware or program module) and to store them together with current time information as program-flow-related event data in the digital data memory. In this case, program flow events represent those events within the computer program, which pertain to the underlying program flow and characterize the fundamental program flow for the control of the individual program modules or program components. Consequently, program-flow-related event data or program flow events are not to be construed as the processing of process data and the individual process data themselves, but rather information regarding the abstract program flow which controls and regulates the individual components of the software. This includes, in particular, task switches or process switches, thread switches, interrupts and events that can occur within the underlying program flow in conventional multitasking systems.

These program-flow-related event data are then stored with current time information in the digital data memory, wherein the arithmetic unit of the automation device is arranged such that it continuously sends these program-flow-related event data stored in the digital data memory to the analysis device connected via the data interface.

Using the present invention, it is thus possible to document such program-flow-related event data generated within the program flow at the occurrence of a corresponding program flow event and send these to an analysis device connected over a network so as to gain insight into the underlying program flow and to obtain its corresponding event data. As a result, for example, the synchronicity of processes that run on different automation devices can be captured since now all program-flow-related event data converge at a central analysis device and thus, the respective program flow events in the individual automation devices can be compared.

Thus, it becomes possible, for example, to be able to check corresponding task switches on the various automation devices with regard to temporal synchronicity if it must be ensured that the individual program tasks or program processes run in a time-synchronized manner. By detecting a corresponding task switch as a program-flow-related event and by transmitting it as program-flow-related event data to the analysis device, the corresponding task switch can be detected in each of the connected automation devices, and the temporal synchronicity can be checked.

As already mentioned, it is particularly advantageous when with the aid of the arithmetic unit, the automation device is configured to capture task switches or process switches, thread switches, interrupts, and/or events as program flow events and to store these as corresponding program-flow-related event data in the digital data memory.

Here, as already mentioned, it is advantageous if the automation device is set up to run firmware, wherein the firmware has a process scheduler designed to capture a task switch or thread switch and to store a captured task switch and/or thread switch as program-flow-related event data together with current time information in the digital data memory. The current time information can generally be an IEC1588 timestamp. The process scheduler of the firmware is the program routine that successively runs the various task or program processes in multitasking systems. Initially, the context of the previous task is saved and then the context of the current task to be run is loaded, wherein the corresponding new task is run after the new task context has been loaded. According to the invention, such a process scheduler is now further developed such that together with the time information, it displays the corresponding task switch, i.e., between the saving of the old task context and the loading of the new task context or the running of the loaded task context, by creating program-flow-related event data. In this way, each task switch can be documented, wherein together with the stored time information it can then be determined whether, for example, the respective tasks run temporally synchronously or asynchronously to each other across several automation devices.

The firmware advantageously has an interrupt handler, which is designed to capture an interrupt and store a captured interrupt as program-flow-related event data together with current time information in the digital data memory. This also allows for any interrupt that leads to an interruption in the main routine of the firmware to be documented and analyzed.

It is also conceivable for the firmware to have an event handler which is designed to capture events and store a captured event as program-flow-related event data together with current time information in the digital data memory, whereby events within the program flow can also be temporally documented.

It is of course advantageous if, for each program-flow-related event date, unique event identification is stored as a program-flow-related event date. This allows for any event (e.g., task or task switch, thread or thread switch, interrupt or event) to be identified and displayed accordingly.

The automation device can be set up to detect a switch in a captured program flow event from a first state to a second state and/or from a second state to a first state and to store it as program-flow-related event data together with current time information in the digital data memory. Thus, for example, in the case of a detected switch from a first state to a second state or from a second state to a first state, the time information can be stored together with unique event identification in the digital data memory as a program-flow-related event date, whereby together with the stored time information, the event identification can be used to determine when this event switched its state. It is also conceivable, of course, that the information as to in which state the event switched is also stored.

For example, it is advantageous if, during a task switch, the current task into which the program has just switched is detected as a program flow event and then documented accordingly, wherein the current task switched from a first state (inactive) to the second state (active). This switch from the inactive state to the active state is detected and stored in the digital data memory. This can be done, for example, by storing the event identification together with the time information.

In this context, it is particularly advantageous if for sequential events only a switch from the first state to the second state is detected and stored so that in sequential events, for example, only a switch from an inactive to an active state is detected and stored. As soon as a new switch of such a sequential event, for example a task switch, takes place, the event previously recognized in the second state is again marked as inactive or as being in the first state, in which case the subsequent sequential event is then marked as active.

For sequential events, this is possible because only one event can ever be in the second state, while all other sequential events are in the first state. In order to reduce the amount of data accumulated during the logging of the program flow events, in particular, it is advantageous since only the switch from the first state to the second state is identified and documented as program-flow-related event data. This switch automatically results in all other sequential events being in the first state.

However, for parallel events it is conceivable that two or more events may be in the second state (e.g., active), so it is advantageous here if both a switch from the first to the second state and a switch from the second to the first state is documented as a program flow event.

The automation device can be set up in such a way that the arithmetic unit is given a fixed time window for the continuous transmission of the program-flow-related event data to the analysis device connected via the data interface, wherein the fixed time window can be fixed with regard to the point in time as well as the time duration. In this way, it can be ensured that by transmitting the program-flow-related event data to the analysis device, which likewise requires a corresponding time window during processing by the arithmetic unit, the synchronization result as a whole is not falsified.

As already mentioned, it is particularly advantageous if the automation system has a plurality of automation devices which are connected to the analysis device via the data interface, wherein the analysis device is designed to receive program-flow-related event data of the automation devices and to display the program-flow-related event data of various automation devices.

Furthermore, it is particularly advantageous if the data interface of the automation device is different from the fieldbus interface, so that the bandwidth of the fieldbus and thus the transmission of the process data is not affected by the transmission of the program-flow-related event data.

Also described is a method for monitoring at least one automation device in process automation, wherein at least one computer program is run on the at least one automation device, the method comprising the following steps: capture of program flow events occurring during the running of the at least one computer program by the automation device and storing the captured program flow events together with current time information as program-flow-related event data in a digital data memory of the automation device; continuous transmission of the program-flow-related event data stored in the digital data memory to an analysis device connected via a data interface of the automation device; and display of the program-flow-related event data on a display of the analysis device.

Preferably, using the method, task switches, thread switches, interrupts and/or events are captured as program flow events and are stored as program-flow-related event data in the digital data memory.

Preferably, firmware is run on the automation device, wherein a task switch and/or a thread switch is captured by a process scheduler of the firmware and is stored as program-flow-related event data together with current time information in the digital data memory; an interrupt is captured by an interrupt handler of the firmware and stored as program-flow-related event data together with current time information in the digital data memory; and/or an event is captured by an event handler of the firmware and stored as program-flow-related event data together with current time information in the digital data memory.

Preferably, by using the method, the automation device detects a switch from a first state to a second state and/or from a second state to a first state and captures it as a program flow event, wherein the switch is stored in the digital data memory as program-flow-related event data together with current time information.

In this case, the method can include the step of storing unique event identification as program-flow-related event data.

In the case of sequential events, preferably only one switch from the first state to the second state is detected and stored by the automation device, wherein in the case of parallel events, both a switch from the first state to the second state and a switch from the second state to the first state is detected and stored by the automation device. Preferably, the automation device is given a time window for the continuous transmission of the program-flow-related event data to the analysis device connected via the data interface, so that the automation device continuously transmits the program-flow-related event data via the data interface within a specified time window.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
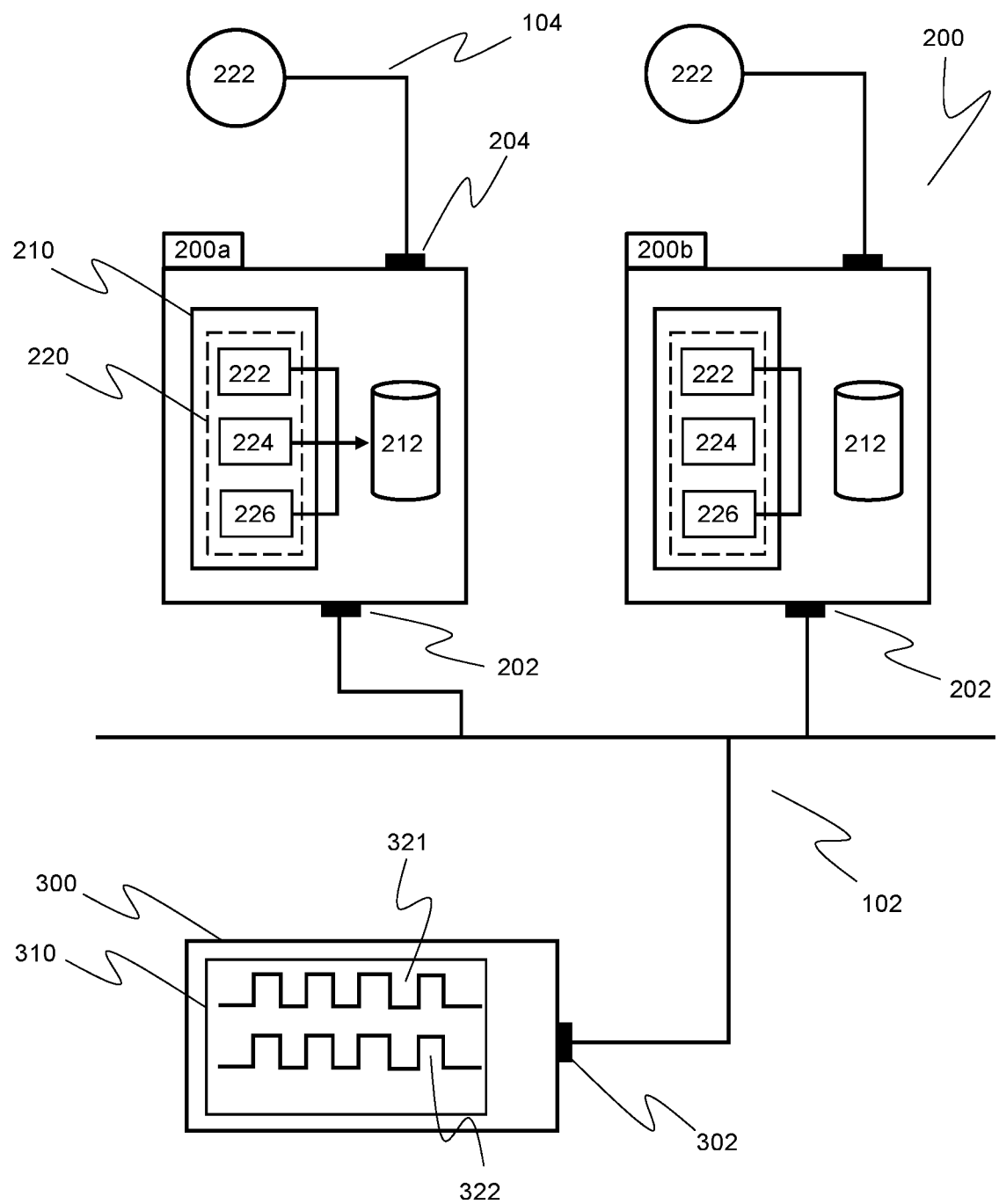
FIG. 1 is a schematic representation of an automation system.

FIG. 1 schematically shows an automation system 100 which, in the exemplary embodiment of FIG. 1, has two automation devices 200a and 200b. In the following, such an automation device is always marked with 200. Furthermore, the automation system 100 has an analysis device 300, which is connected via a data connection 102 with the automation devices 200. For this purpose, each automation device 200a, 200b has a data interface 202 via which the automation devices 200 are connected to the data connection 102 and thus connected to the analysis device 300. The analysis device 300 has a respective corresponding data interface 302 so that it can also connect to the data connection 102. The data connection 102 can be, for example, an Ethernet network.

Such an automation device 200 also has a fieldbus interface 204, with which the respective automation device 200 is connected to a fieldbus 104. Additional fieldbus devices 106 may be connected to the fieldbus 104, such as sensors or actuators. Accordingly, via this fieldbus 104, process data for process automation can be exchanged between the automation device 200 and the fieldbus device 106.

In the exemplary embodiment of FIG. 1, the fieldbus interface 204 differs from the data interface 202, so that a corresponding network communication on the data connection 102 does not affect the transmission of process data on the fieldbus 104.

Each of the automation devices 200 also has an arithmetic unit 210, which may be, for example, an arithmetic unit controlled by a microcontroller or microprocessor. In this case, the arithmetic unit 210 is connected to a digital data memory so as to, for example, load or store data.

In this case, the automation device 200 is set up with the aid of the arithmetic unit 210 and optionally also the digital data memory 212 to run firmware 220, wherein the firmware 220 has a process scheduler 222, an interrupt handler 224 and an event handler 226.

With the aid of the process scheduler, a switch is made between different tasks of a multitasking system, wherein with each task or thread switch, this event is captured as a program-flow-related event and is stored as program-flow-related event data in the digital data memory 212, together with time information. This time information is generated at the respective task or thread switch which was detected by the process scheduler 222, and is then stored in the digital data memory 212 with a unique identification.

The same also applies to the interrupt handler 224, which generates corresponding program-flow-related event data both at the beginning of an interrupt and at the end of the interrupt, and then stores this together with time information in the digital data memory 212.

The same also applies to the event handler 226, which stores corresponding program-flow-related event data together with current time information in the digital data memory 212 when an event occurs within the program routine.

The arithmetic unit 210 is designed such that it transmits the program-flow-related event data stored in the digital data memory 212 via the data interface 202 and the data connection 102 to the analysis device 300, which receives the program-flow-related event data and can then timely represent the various program-flow-related event data based on the contained time information. During runtime, the program-flow-related event data merely characterize a switch from a first state to a second state, or vice versa; this binary code can be represented by a corresponding two-state oscilloscope presentation. Thus, with the aid of the analysis device 300 and a display 310, for example, first program-flow-related event data 321 of the first automation device 200a and second program-flow-related event data 322 of the second automation device 200*b* can be displayed simultaneously, so that it can be checked whether both devices are synchronously running their processes using the arithmetic unit 210.

Figure 2:
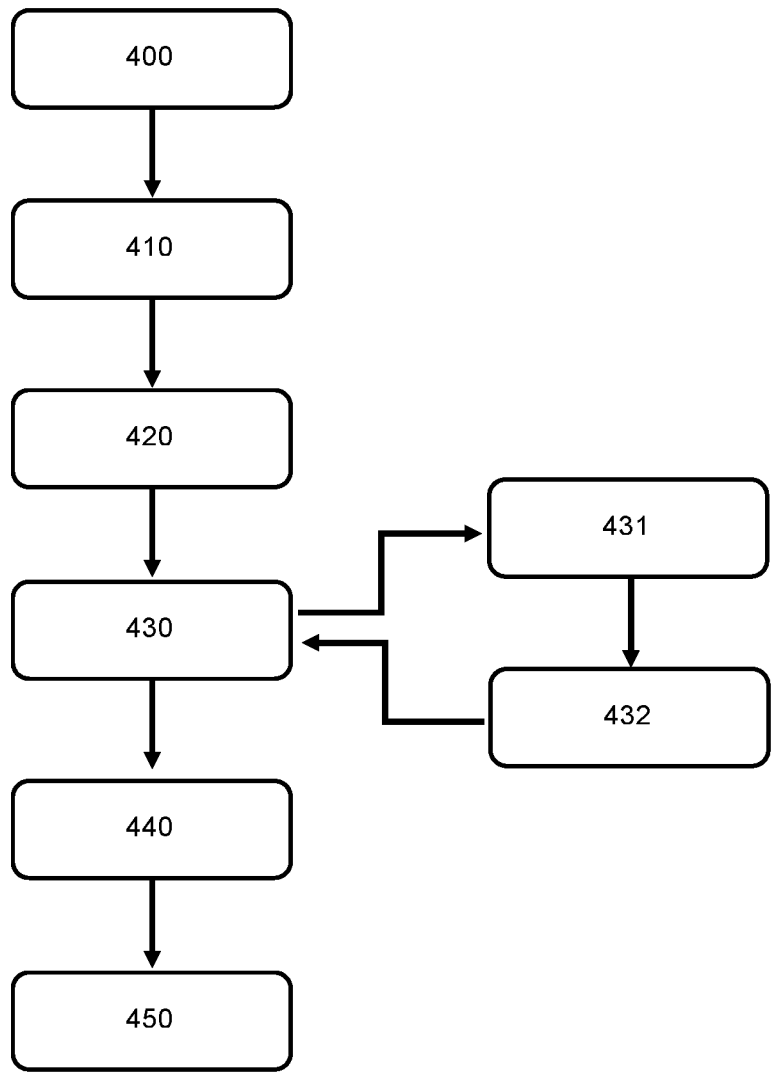
FIG. 2 is a representation of a flow during the task switch.

FIG. 2 shows a flow during a task switch using the process scheduler, as shown in FIG. 1. In the first step 400, initially the context of the current task is saved, since now a task switch is pending. In the next step 410, further intermediate steps of the process scheduler can be carried out, which are necessary for the corresponding tasks of the process scheduler. Subsequently, in step 420, the loading of the context for the new task is prepared.

Prior to the context of the new task being correspondingly loaded for running, such a task switch is initially documented in step 430 as described above by first fetching the current time information in a step 431, and then in step 432, a unique identification of the task to be loaded or a unique identification of the process scheduler per se is written together with the time information in the digital data memory. The digital data memory can be designed, for example, as a ring memory. After completion of step 430, the unique identification and the time information regarding the task switch can be found in the data memory as program-flow-related event data, which can then be sent independently in a separate task to the analysis device. In the now following step 440, the new task is then loaded with its context and then run accordingly in step 450, so that the task switch is concluded upon completion of step 450.

Figure 3:
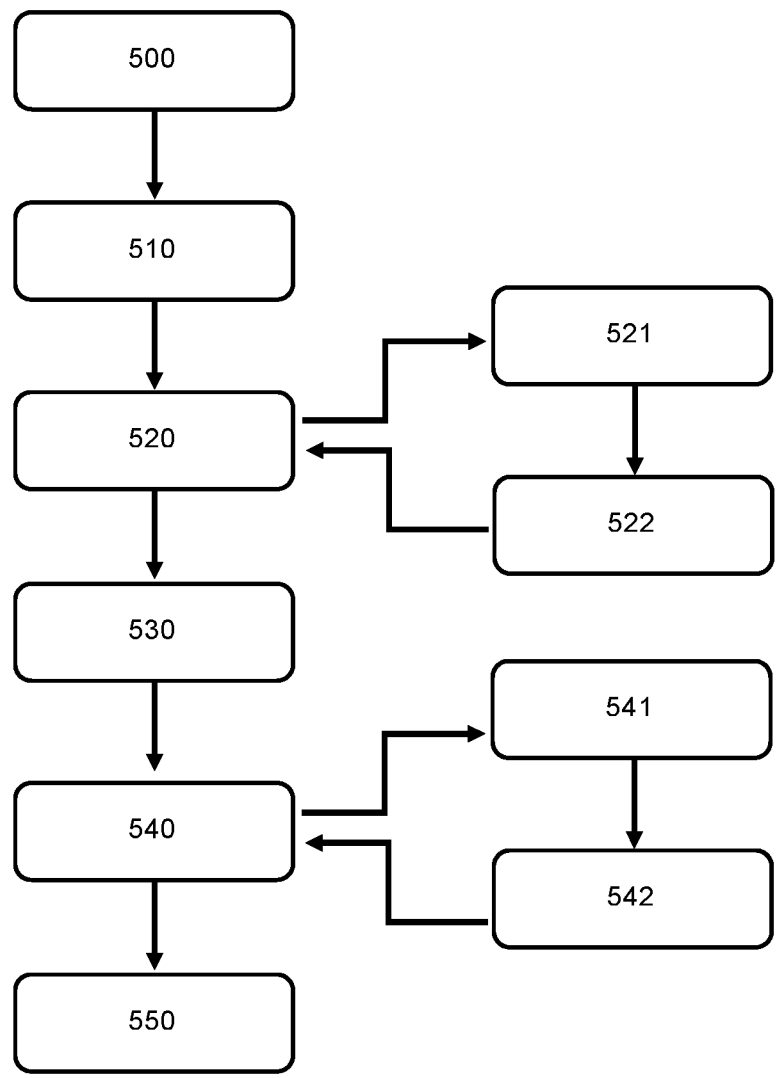
FIG. 3 is a representation of a flow.

Such a task switch of specified or predefined tasks is usually time-controlled, with only one task per se able to run on the hardware per processor core. As a result, all other tasks are inactive. In the case of an interrupt, which usually requires a corresponding time-independent resource of the arithmetic unit, it can occur that several interrupts are active at the same time, depending on the timing, whereby in this case both the switch from the inactive to the active as well as the switch from the active to the inactive state should be documented. This flow is shown by way of example in FIG. 3.

First, in the event of an interrupt, the current context of the task is saved, which is done in the first step 500. Subsequently, the corresponding interrupt service routines are called in step 510 to prepare for interrupt handling. In the subsequent step, i.e., before the actual interrupt handling 530, the occurrence of the interrupt and the activation or beginning of the interrupt handling is documented in step 520 by first obtaining current time information in step 521 and then writing this time information together with a unique identification to the digital data memory in step 522. The unique identification may be, for example, the interrupt ID. After completion of step 520, the interrupt handling 530 can then take place. In step 540, upon completion of the interrupt handling 530, the end of the interrupt handling is now documented by first retrieving the current time information in step 541 and then writing the interrupt ID along with the acquired time information to the digital data memory in step 542.

After completion of step 540, the previous task context may then be restored in step 550.

This can ensure that both the beginning and the end of an interrupt handling can be documented accordingly. This is important because both the occurrence of interrupts and their handling are ultimately not subject to a fixed time pattern and thus, the switch from both the inactive to the active as well as from the active to the inactive state should be documented.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. An automation system for process automation, the automation system comprising:
    at least one automation device having at least one fieldbus interface for connection to a bus for transmitting process data;
    an arithmetic unit;
    a digital data memory; and
    a data interface for the transmission of program-flow-related event data; and
    an analysis device connected to the at least one automation device via the data interface and configured to receive and display the program-flow-related event data of the at least one automation device,
    wherein the automation device is configured to run one or more computer programs with the aid of the arithmetic unit and to capture program flow events occurring in the running of the one or more computer programs and to store these together with current time information as program-flow-related event data in the digital data memory,
    wherein the arithmetic unit of the automation device is configured to continuously transmit the program-flow-related event data stored in the digital data memory to the analysis device connected via the data interface, and
    wherein for sequential events, the automation device is configured to exclusively detect and store a switch from a first state to a second state, or for parallel events, to both detect and store a switch from the first state to the second state and from the second state to the first state.

2. The automation system according to claim 1, wherein the automation device is configured to capture task switches, thread switches, interrupts and/or events as program flow events with the aid of the arithmetic unit.

3. The automation system according to claim 2, wherein the automation device is configured to run firmware, wherein the firmware has a process scheduler designed for capturing a task switch and/or thread switch and for storing a captured task switch and/or thread switch as program-flow-related event data together with current time information in the digital data memory, wherein the firmware has an interrupt handler adapted to capture an interrupt and to store a captured interrupt as program-flow-related event data along with current time information in the digital data memory, and/or wherein the firmware has an event handler, which is designed for capturing events and for storing a captured event as program-flow-related event date together with current time information in the digital data memory.

4. The automation system according to claim 1, wherein the automation device is configured to detect the switch from the first state to the second state or from the second state to the first state in a captured program flow event, and to store the detected state switch as program-flow-related event data together with the current time information in the digital data memory.

5. The automation system according to claim 1, wherein the automation device is further configured to store unique event identification as program-flow-related event data.

6. The automation system according to claim 1, wherein the arithmetic unit is given a fixed time window for continuous transmission of the program-flow-related event data of the one or more computer programs to the analysis device connected via the data interface during which the arithmetic unit transmits.

7. The automation system according to claim 1, wherein the automation system has a plurality of automation devices that are connected to the analysis device via the data interface, wherein the analysis device is designed to receive program-flow-related event data of the automation devices and to display the program-flow-related event data of various automation devices.

8. The automation system according to claim 1, wherein the data interface of the automation device is different from the fieldbus interface.

9. The automation system according to claim 1, wherein the one or more computer programs of the automation device are application programs run specifically for process automation.

10. A method for monitoring at least one automation device in process automation, wherein at least one computer program is run on the at least one automation device, the method comprising:
capturing, by the at least one automation device, program flow events occurring during the running of the at least one computer program, the program flow events occurring within the computer program running on the automation device;
storing the captured program flow events together with current time information as program-flow-related event data in a digital data memory of the automation device;
continuously transmitting the program-flow-related event data stored in the digital data memory to an analysis device connected via a data interface of the automation device; and
displaying the program-flow-related event data on a display of the analysis device,
wherein in sequential events, only a switch from a first state to a second state is detected and stored by the automation device, or in parallel events, both the switch of the first state to the second state as well as from the second state to the first state is detected and stored by the automation device.

11. The method according to claim 10, wherein task switches, thread switches, interrupts and/or events are captured as program flow events.

12. The method according to claim 11, wherein a firmware is run on the automation device, wherein a task switch and/or thread switch is captured by a process scheduler of the firmware and stored as program-flow-related event data together with current time information in the digital data memory,
wherein an interrupt is captured by an interrupt handler of the firmware and stored as program-flow-related event data together with current time information in the digital data memory, and/or wherein an event is captured by an event handler of the firmware and stored as program-flow-related event data together with current time information in the digital data memory.

13. The method according to claim 10, wherein, in a captured program flow event, the switch from the first state to the second state and/or from the second state to the first state is detected by the automation device and stored as program-flow-related event data along with current time information in the digital data memory.

14. The method according to claim 13, wherein unique event identification is stored as a part of the program-flow-related event data when the switch is detected by the automation device.

15. The method according to claim 10, wherein within a specified time window, the automation device continuously sends the program-flow-related event data to the analysis device connected via the data interface.

16. The method according to claim 10, wherein the at least one automation device includes a first automation device and a second automation device, the first automation device transmitting first program-flow-related event data and the second automation device transmitting second program-flow-related event data, and
wherein the analysis device is adapted to simultaneously display the transmitting first program-flow-related event data and the second program-flow-related event data.

17. The method according to claim 10, wherein an arithmetic unit of the automation device is given a fixed time window, during which the arithmetic unit transmits, for the continuous transmission of the program-flow-related event data of the at least one computer programs to the analysis device.

18. The method according to claim 10, wherein the at least one computer program of the automation device are application programs run specifically for process automation.

* * * * *